(12) United States Patent
Hauck (10) Patent No.: US 7,432,458 B2
(45) Date of Patent: Oct. 7, 2008

(54) MONOLITHIC WEIGHT SENSOR

(75) Inventor: Timo Hauck, Kaiserslautern (DE)

(73) Assignee: Wipotec Wiege- und Positioniersysteme GmbH, Kaiserslautern (DE)

( * ) Notice: Subject to any disclaimer, the term of this patent is extended or adjusted under 35 U.S.C. 154(b) by 233 days.

(21) Appl. No.: 10/578,019

(22) PCT Filed: Dec. 3, 2004

(86) PCT No.: PCT/DE2004/002669

§ 371 (c)(1),
(2), (4) Date: May 4, 2006

(87) PCT Pub. No.: WO2005/054796

PCT Pub. Date: Jun. 16, 2005

(65) Prior Publication Data

US 2007/0125185 A1     Jun. 7, 2007

(30) Foreign Application Priority Data

Dec. 5, 2003   (DE)   ................... 203 19 017 U (51) Int. Cl.
G02G 7/02 (2006.01)
G01G 7/00 (2006.01)

(52) U.S. Cl. .............................. 177/210 EM; 177/229; 73/862.639

(58) Field of Classification Search ................ 177/136, 177/210 EM, 229
See application file for complete search history.

(56) References Cited

U.S. PATENT DOCUMENTS

| 5,340,951 | A  | * | 8/1994  | Hungerbuhler et al. ..... 177/229 |
| 6,365,847 | B1 | * | 4/2002  | Muller et al. ......... 177/210 EM |
| 6,472,618 | B1 | * | 10/2002 | Izumo et al. ......... 177/210 EM |
| 6,693,245 | B2 | * | 2/2004  | Watabiki et al. ...... 177/210 EM |

* cited by examiner

Primary Examiner—Edward Lefkowitz
Assistant Examiner—Punam Patel
(74) Attorney, Agent, or Firm—The Culbertson Group, P.C.

(57) ABSTRACT

A weight sensor includes at least one force-translating element cooperating in a levered manner in response to an applied load. The at least one force-translating element is arranged at least in part asymmetrically to an imaginary center plane of the weight sensor.

23 Claims, 4 Drawing Sheets

10; # MONOLITHIC WEIGHT SENSOR

TECHNICAL FIELD OF THE INVENTION

The present invention pertains to a preferably monolithically constructed weight sensor.

BACKGROUND OF THE INVENTION

Weight sensors are known from the prior art and are employed particularly for electronic balances operating according to the principle of electromagnetic compensation. In this type of scale, a load receiver guided movably with respect to a base body is subjected to a weight to be weighed, this weight normally being reduced by means of transmission elements and ultimately compensated by means of an electromagnetic coil.

The weight sensor is preferably constructed monolithically, i.e., from a single piece, in order to avoid nonuniform heat strains or other disruptive properties originating from differing materials.

A weight sensor in which at least three force-reduction translating levers are provided is known from DE 199 23 207 C1. A section fixed relative to the housing extends into the area of the translating levers so as to form support points for the latter. The projecting section here runs essentially symmetrically relative to an imaginary vertical plane passing through the coil and the weight sensor.

The prior art has the disadvantage that the monolithically constructed weighing bearings are difficult to manufacture. At the same time, the desired compact construction is not sufficiently attained.

The problem of the invention is therefore to offer a weight sensor that can be manufactured in a simple manner, with a compact design, and therefore economically.

SUMMARY OF THE INVENTION

The present invention starts from the recognition that an advantageous and simple construction of monolithic weight sensors can be achieved by forming or arranging individual force-translating elements asymmetrically, at least in part, relative to a plane E. Structured space is saved thereby and machining is advantageously simplified, as will be seen below.

A simplest embodiment of the invention is accordingly constructed such that the weight sensor comprises a fixed base body and a load receiver. The load receiver is separated from the base body in a certain direction X, articulated to it by means of parallel guide elements, and serves as an absorption for a weight to be detected. It is also movable in a direction Y perpendicular to direction X, and thus in the direction of the weight applied to the load receiver.

Also provided are force-translating elements acting in series in the sense of a levered force transfer. These force-translating elements, which reduce translated forces according to the simple laws of leverage, for instance, are coupled together such that the force introduced into a first force-translating element is reduced by a factor, and this reduced force is introduced into the next force-translating element. A weight can be reduced by such coupled force-translating elements down to the magnitude required for electronic detection.

That element which directly or via a coupling element experiences the force introduced into the load receiver is referred to below as the "first" force-translating element. The additional elements are then arranged, starting from the load receiver, in a conceptual force flow direction "downstream" of the first force-translating element towards the coil, wherein coupling elements that relay the force to be transferred essentially unchanged can be provided between the force-translating elements.

The last force-translating element will be understood below to be that element which effects the last force-translation process in the direction of force flow. On this last translation element, or on a lever arm disposed thereon, is arranged the aforementioned coil, which is to compensate the weight-induced deflection of the last force-translating element with a suitable current.

For an understanding of the above-mentioned asymmetrical arrangement, let an imaginary plane E be provided that extends in the X and Y directions, thus also in the direction of the weight applied to the load receiver, and divides the load receiver or the weight introduced into it symmetrically and vertically. Preferably, a homogeneous introduction of weight into the load receiver is assumed so that the plane divides the introduced weight into two equal parts. With a central arrangement of the coil, it is accordingly also symmetrically divided.

The prior art provides for the force-translating elements to be constructed symmetrically to the plane so as to generate allegedly equal loads in the "parallel" components of force-translating elements divided, for example, in a fork shape. This requires a relatively large design and manufacturing expense and does not optimally handle the loads on the weight sensor. The advantage of an at least partially asymmetrical arrangement of at least one force-translating element is that one can forgo additional undercut machining as is required for symmetrical or divided force-translating elements.

In the prior art, a projecting part of the base body extends in the X direction from the base body into the area between the force-translating elements in order to form the specified bearing points there. The extension of the projecting part of the base body in the Y direction is expediently chosen to be as large as possible to maximize the rigidity of this part against a force in the Y direction. This effort is spatially impeded, however, by the force-translating elements running essentially in the X direction. In the prior art this was remedied in that the force-translating elements run symmetrically and in a fork shape on both sides of plane E, while the projecting part of the base body extends as far as possible in the Y direction in the intermediate space of the fork. The price of this, however, is that the divided force-translating elements of the two opposing sides of plane E must be machined mirror-symmetrically in order to guarantee a uniform force transfer in the two parts of the divided force-translating element. Correspondingly longer machining times and higher costs are the result.

The device of the invention, on the other hand, proceeds from the idea that the maximum possible rigidity of the projection base body part can be combined with simple and economical machining in the manufacturing process if at least one force-translating element is formed asymmetrically relative to plane E. It is provided, for instance, that the projecting part of the base body on one side of plane E be formed in the Z direction up to the edge of the normally cuboidally-shaped load receiver, while it simultaneously retains a maximal extension, and thus rigidity, in the Y direction.

On the other side of plane E, the above-described maximal Y extension is not retained up to the edge of the load receiver. Instead, it is possible for one or more force-translating elements to be arranged on this side, and thus laterally relative to the projecting part of the base body. These elements can then be produced by access from only one side of plane E, since a corresponding second fork tine of the element is missing on the other side of plane E due to the absence of a symmetrical design. The last force-translating element, or even those preceding it, can then again be run together symmetrically to plane E by means of appropriate cutouts and formed towards the coil, if the coil itself is to be arranged symmetrically relative to plane E.

A simple embodiment of the present invention provides, for instance, that the first force-translating element is formed at first, in the area of its coupling to the load receiver or a coupling element, over the entire Z width of the weight sensor. In particular, the bearing point for this first force-translating element is also formed as wide as possible in the Z direction in order to be able to absorb the relatively large forces and possibly torsion moments at the bearing point effectively.

In its extension in the X direction towards the coupling point for the subsequent force-translating element, however, the first force-translating element is formed asymmetrically relative to plane E so that the projecting part of the base body can extend in the Y direction into the area not occupied by this first force-translating element. In this way, the rigidity of the projecting part is optimized, as described above. The additional force-translating elements arranged in series are then arranged in the Z direction essentially to the side of the projecting part of the base body and thus asymmetrically relative to base plane E. The force introduced into the first force-translating element is thus introduced into the subsequent force-translating element either on only one side of plane E or at least asymmetrically thereto.

According to this embodiment, the additional translation processes then take place on the one side of plane E, but at least asymmetrically relative to it, with the possibility that the last force-translating element with its arm bearing the coil can again be guided into a position symmetrical to plane E by suitable cutouts.

Another advantage of the present invention results from the fact that the individual bearing points for the force-translating elements are arranged on the base body such that it can retain a simple shape with relatively few recesses. The prior art on the other hand requires a complicated structure of the base body since the individual bearing points must often absorb forces in various directions.

A particularly advantageous embodiment of the invention therefore provides that all forces impinging on at least one force-translating element be oriented parallel or antiparallel to one another. Such a condition results if at least one force-translating element is constructed as a lever, in particular, one without relevant angles. The forces impinging on the force-translating element therefore point in the same or in the opposite direction, whereby a simple form of this element becomes possible. In comparison to the prior art, it is obvious that the forces in the latter impinge in mutually perpendicular directions on the element and usually have a complicated form, naturally with many angles, thereby robbing space; manufacturing it is complicated and time-consuming, especially in a monolithic design.

Another advantageous embodiment of the invention provides that each of the force-translating elements that is used is oriented such that the impinging forces are all oriented parallel or antiparallel relative to one another. Especially with such a requirement, a particularly compact construction or arrangement of the elements is possible. All translation forces inside the monolithic block are therefore oriented in one direction (e.g. Y) or opposing one another. The arrangement of bearing points, on which the force-translating elements are supported relative to the stationary base body, can be chosen in an uncomplicated and stable manner, and manufacturing also becomes simpler because of the absence of angular constructions.

A particularly elegant embodiment of the invention provides that the force-translating elements used for force transfer are arranged in an essentially spiral structure. In this way the force-translating elements can be nested in a sense, because the individual levers are essentially parallel to one another, while the force "runs along" the levers in a spiral shape and is stepped down in the process.

In one embodiment of the invention, three force-translating elements are arranged in the sense of a spiral structure. Viewed in an imaginary third direction Z perpendicular to first direction X and second direction Y, the profile of the force-translating elements, possibly in conjunction with the aforementioned coupling elements, appears as a spiral profile. Starting from a first coupling element arranged directly on the load receiver, the first force-translating element runs essentially perpendicular to the first coupling element in the X direction. This first force-translating element is also supported on the base body via a bearing point such that it acts like a lever. A second coupling element, again running essentially perpendicular to the first force-translating element, transfers the initially reduced force to a second force-translating element that again runs perpendicular to the coupling element and therefore parallel to the first force-translating element. In the direction of force flow, the third force-translating element follows via a third coupling element. It is essentially parallel to the two other force-translating elements arranged between them. If one follows the force flow up to the coil, its shape, or the arrangement of the force-translating elements, in the aforementioned spiral structure is obvious.

Considerable structural space is saved by nesting the individual force-translating elements, with the necessary dimensioning of the individual elements having to be taken into account at the same time. With a decreasing force to be transferred, the required profile of the individual elements naturally also decreases, so that the elements situated further to the inside can be correspondingly smaller.

One advantageous embodiment of the invention provides that a section of the final force-translating element or of the lever arm arranged thereon penetrates through the spiral structure from the inside to the outside in order to introduce or remove an external force. Such an arrangement supports the compact construction of the weight sensor in the aforementioned spiral structure on the one hand, and on the other creates sufficient room to compensate the deflection of the final force-translating element with the possibly rather large coil.

Another advantage of the embodiment is that the final force-translating element constitutes a large step-down stage due to the longer lever arm, which is, after all, the function of the force-translating element.

The final force-translating element or a lever arm arranged on it penetrates the spiral structure through, for example, a cutout that is provided in a coupling element or one of the other force-translating elements. The arm bearing the coil can thus be integrally formed as a part of the final force-translating element or formed as a separate arm to be fastened thereon. The latter facilitates manufacture or assembly; the former maintains the monolithic construction of the device.

The inventive asymmetrical arrangement of the force-translating elements and the construction of the projecting part of the base body can be further refined if this projecting part of the base body comprises at least one gradation in the X direction and/or the Z direction. With an appropriate gradation of the projecting part, its rigidity can be adapted to the respective force ratios or requirements. Thus a high rigidity of the projecting part is desirable for a relatively large force, as appears, for example, at the bearing point of the first force-translating element. If the force to be exerted on the bearing points is reduced due to step-down translation, then a lower rigidity of the projecting part in the area of the bearing point for the respective force-translating element is sufficient to meet the requirements for precision of the weighing result. In this way, unnecessary accumulation of material can be circumvented, which makes it possible to forgo unnecessary weight.

The projecting part advantageously extends into the area which is not claimed spatially by the asymmetrical arrangement of the force-translating elements. For stability it can fill out the space offered to it as well as possible, but it can also be kept smaller in order to save weight or for manufacturing purposes.

Another advantageous embodiment of the invention provides that the rigidity of the projecting part in the area of a bearing point be formed qualitatively or proportionally according to the force acting on the bearing point from the associated force-translating element. This means that the contact pressure force on a given bearing point, which decreases in the direction of force flow, influences the associated dimensioning of the projecting base body part. A smaller contact pressure force requires a lower rigidity of the projecting part. This dimensioning can be optimized by matching or sizing the respective support area of the bearing points or of the associated projecting base body part precisely to the loads to be expected.

Thus, if a force-translating element brings about a reduction by a certain factor, the bearing point for the subsequent force-translating element can be dimensioned correspondingly thinner and still meet the requirements for weighing precision. A qualitative adaptation therefore implies only a fundamental reduction of the existing dimensions of the projecting part in the respective bearing points, but a proportional adaptation requires a precise calculated determination of the required shape of the projecting part in the area of the associated bearing point as a function of the forces to be absorbed there.

Another advantageous embodiment of the invention provides that at least one section of the projecting base body part takes on, in the Y direction, the maximum height between the parallel guide elements. It is assured in this manner that the projecting base body part has the best possible rigidity to counteract deformation. By virtue of the prescribed asymmetrical construction, the base body part can also ideally extend over the entire height between the two parallel guide elements. Only the recesses of material for delimitation from the parallel guide elements limit the dimensioning of the projecting part in the Y direction. The greater that one can make the projecting part be elongated in the Y direction, the less the force introduced into a bearing point can contribute to deformation of the projecting part and therefore to an erroneous measurement.

Monolithic weighing systems constructed according to the prior art, with their force-translating elements constructed symmetrically or in a fork shape, prevent such an elongation of the projecting part or require machining from both sides of the block.

Another embodiment of the invention is constructed such that the cutouts arranged between the elements to define them can made in the weight sensor from only one machining side.

Since force-translating elements and the projecting base body part are arranged asymmetrically in the weight sensor, the requirement for parallel structures is largely avoided. In particular, if the projecting base body part extends in the Z direction up to lateral edge of the weight sensor up to its maximum height, then no force-translating element is arranged on this side. This or additional force-translating elements is or are inserted into the opposite side of the weight sensor.

Manufacturing is then advantageously possible from only one side of the weight sensor. All the cutouts that run completely through the weight sensor in the Z direction can be cut in from one side. This saves considerable overall width and permits considerably more economical production than the prior art.

With this asymmetrical arrangement, it is also advantageously possible to forgo cutouts in the parallel guide elements. Therefore the latter are formed continuously in the X and Z direction in a favorable embodiment, and offer the maximum stability possible for the guided weight sensor. Since the cutouts that are required for machining in the Y direction according to the prior art become superfluous in the present invention, machining time and thus costs are saved here as well.

A particularly advantageous embodiment is characterized in that the weight sensor does not extend more than 30 mm in the Z direction. This particularly narrow construction with simultaneous simple and fast machining can be achieved only because of the asymmetrical construction, in which, for instance, the projecting base body part extends roughly 15 mm in the Z direction from the unmachined side wall up to approximately the middle of the weight sensor, while one or more force-translating elements are formed on the additional 15 mm up to the opposite side of the weight sensor. It goes without saying that a different distribution between projecting base body part and force-translating elements can also be chosen.

BRIEF DESCRIPTION OF THE DRAWINGS

An embodiment of the invention will be explained below on the basis of an example in figures.

DESCRIPTION OF PREFERRED EMBODIMENTS

Figure 1:
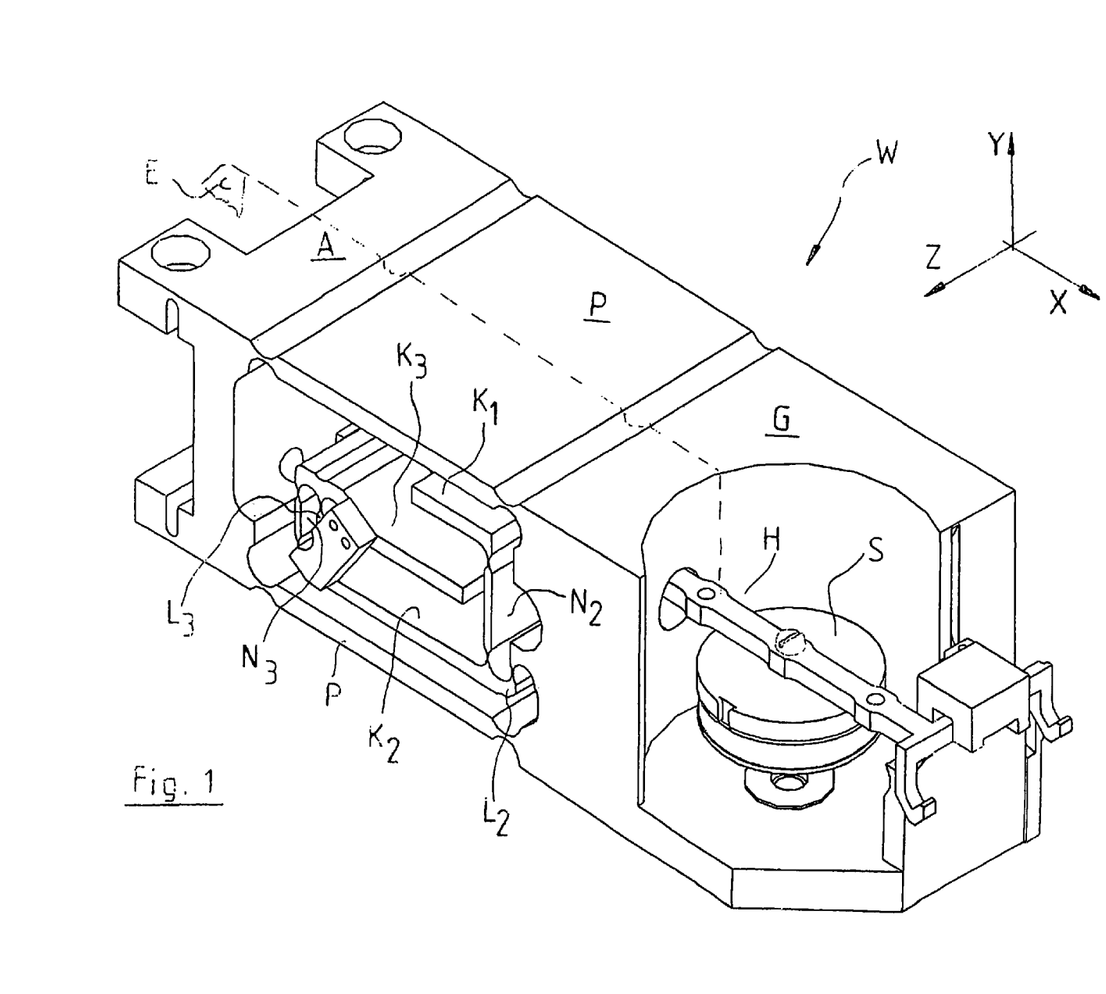
FIG. 1 is a partially cut-away schematic perspective view of one embodiment of the invention.

As is recognizable in FIG. 1, a weight sensor W is provided that comprises a base body G. Two parallel connecting guide bars P that are capable of guiding load receiver A in a direction Y run along a first axis X. A weight placed on load receiver A acts on load receiver A in the opposite Y direction and tends to push the latter downwards.

Between the two parallel guide bars P, three force-translating elements $K_1$, $K_2$, $K_3$ are arranged. Force-translating element $K_1$ is articulated by a coupling element $N_2$ to force-translating element $K_2$. Force-translating element $K_2$ is linked to an additional force-translating element $K_3$ by way of an additional coupling element $N_3$.

Load receiver A is articulated to the only partially shown force-translating element $K_1$ by means of a coupling element $N_1$, not visible in FIG. 1.

All force-translating elements $K_1$, $K_2$, $K_3$ are connected to the stationary base body G via bearing points. Force-translating element $K_2$ is linked at bearing point $L_2$, and force-translating element $K_3$ is articulated at bearing point $L_3$. The bearing point for force-translating element $K_1$ is not visible in FIG. 1.

Force-translating element $K_3$ extends, partially obscured by upper parallel guide bar P and force-translating element $K_1$, with a lever arm H in the direction towards coil S. As can be seen particularly well from FIG. 4, lever arm H is subjected to a force that is to be compensated by a suitable coil currents whenever load receiver A is subjected to a load.

Load receiver A is symmetrically divided by an imaginary plane E, indicated by dashed lines, which runs along the Y and X directions. In this example, the coil is arranged asymmetrically relative to plane E, but it can also be placed symmetrically thereto.

Figure 2:
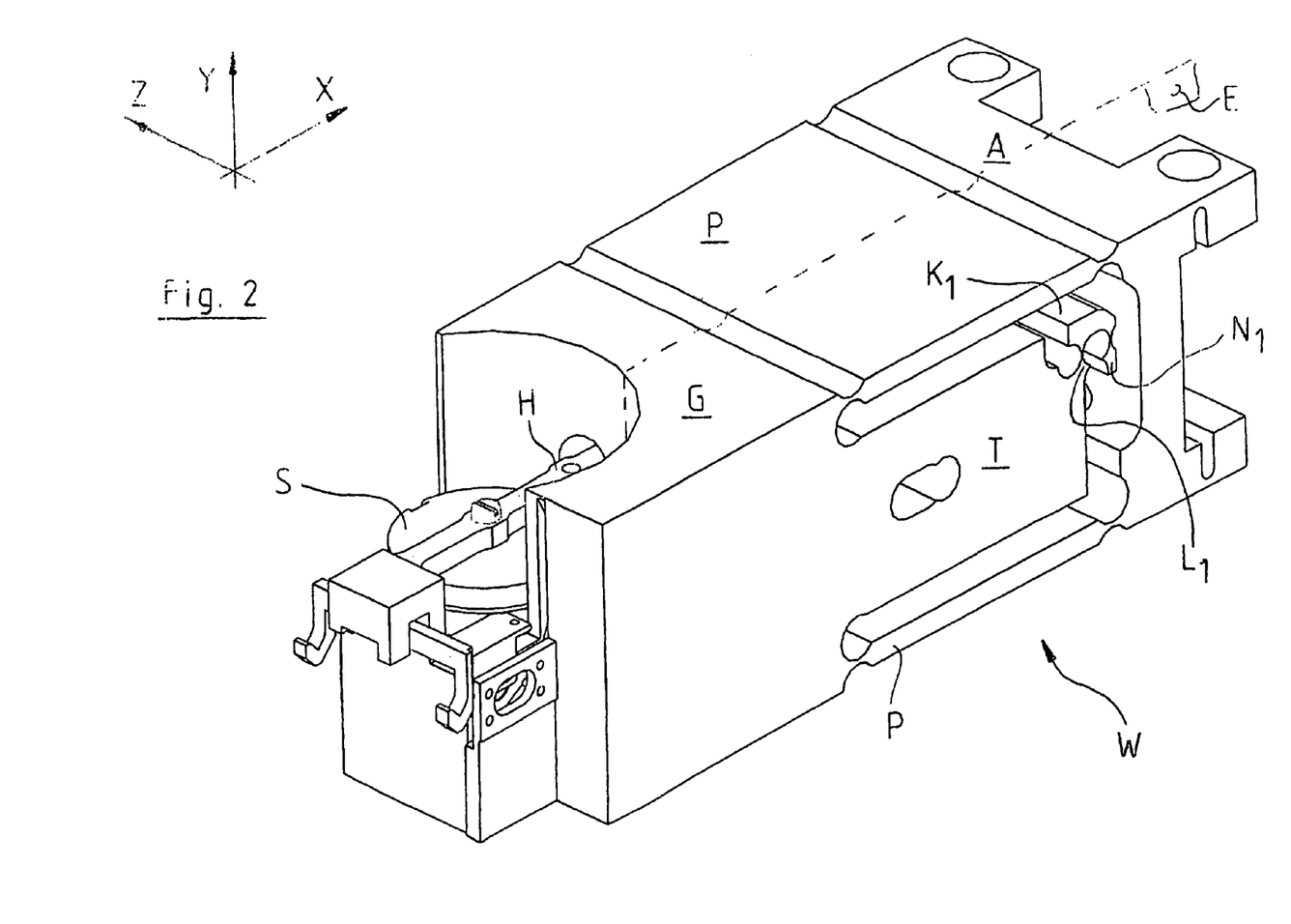
FIG. 2 is a partially cut-away rear perspective view of the embodiment shown in FIG. 1.

FIG. 2 shows the same device in a rear view, so that weight sensor W is shown from its rear side relative to FIG. 1.

Base body G is again recognizable as well as the two parallel guide bars P, which guide load receiver A in an articulated manner. Additionally visible is the section of force-translating element $K_1$ extending up to the rear side. Force-translating element $K_1$ rests via a bearing point $L_1$ on a part T projecting from base body G. Force-translating element $K_1$ can be pivoted by a virtual amount in plane E, likewise indicated by dashed lines, or parallel thereto on bearing point $L_1$, which is formed into a thin section.

Also recognizable is a part of first coupling element $N_1$ which, obscured by projecting part T, connects first force-translating element $K_1$ to load receiver A.

Figure 3:
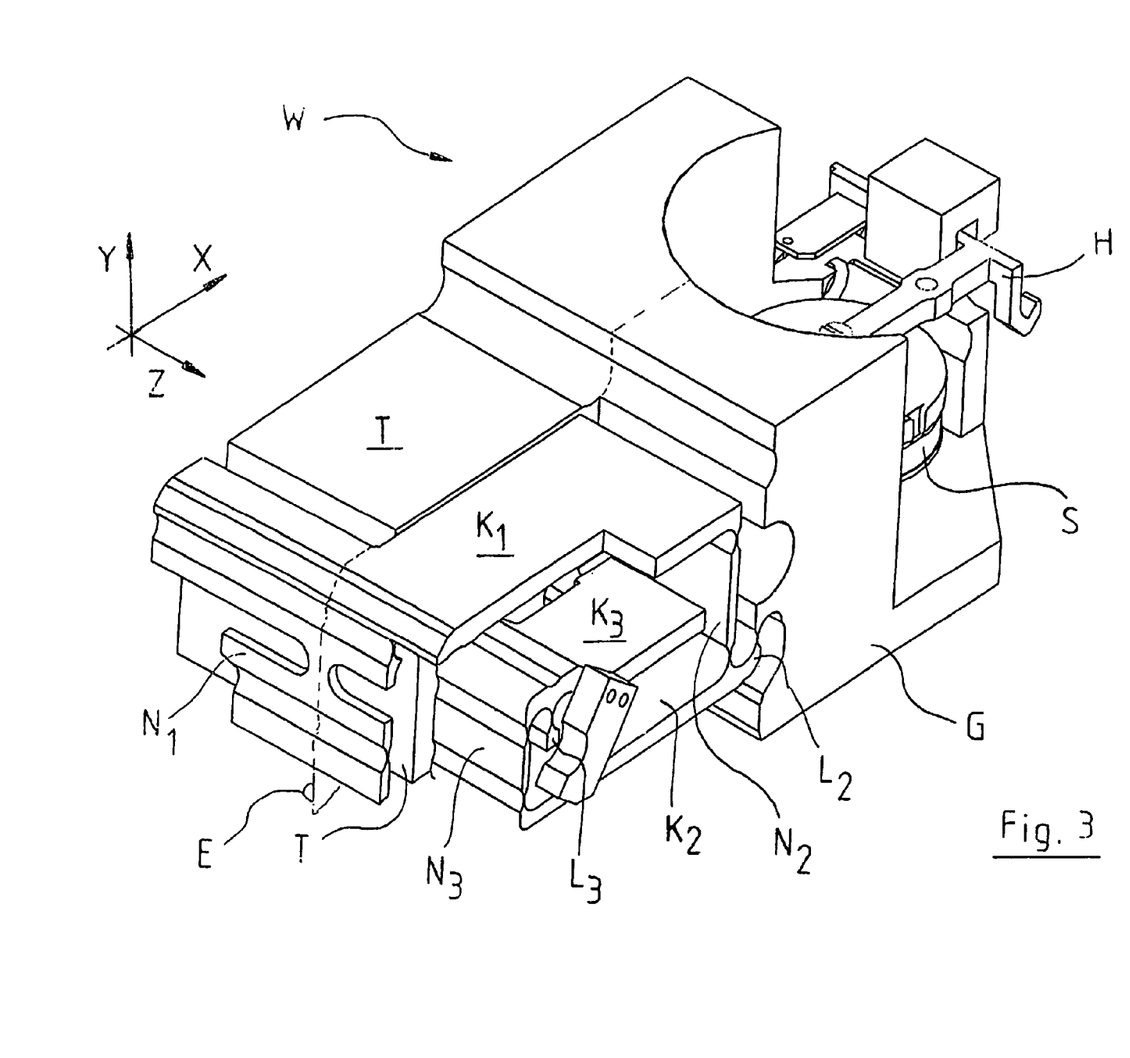
FIG. 3 is a partially cut-away perspective view of the embodiment shown in FIG. 1.

As can be seen in comparison to FIGS. 1 and 3, projecting part T is formed only on one side of the imaginary plane E (opposite to the Z direction) up to the edge of the cuboidal shape of the weight sensor, i.e., asymmetrically relative to plane E.

In FIG. 3, the arrangement of the force-translating elements can be recognized in better detail with parallel guide bars P removed.

Coupling element $N_1$, which engages with load receiver A, not shown, transfers a force introduced in the opposite Y direction into coupling element $N_1$ to first force-translating element $K_1$. Force-translating element $K_1$ runs on one side of imaginary plane E in the opposite Z direction up to the rear edge of weight sensor W. On the other side of plane E, force-translating element $K_1$ does not quite reach the front side of weight sensor W.

It extends further in the X direction essentially on only one side of plane E, but in any case asymmetrically thereto, towards base body G. It also rests on a bearing point $L_1$, not shown in detail in FIG. 3, which is formed roughly analogously to the width of projecting part T in the Z direction on that part T.

At its end facing towards base body G, force-translating element $K_1$ is articulated by way of a coupling element $N_2$ to force-translating element $K_2$. Force-translating element $K_2$ is connected via bearing point $L_2$ to base body G, and acts at its end turned towards load receiver A not-shown on third force-translating element $K_3$ via a third coupling element $N_3$. The two force-translating elements $K_2$ and $K_3$ are arranged essentially on only one side of imaginary plane E; they thus run laterally (in the Z direction) from projecting part T.

Force-translating element $K_3$ rests on a bearing point $L_3$, which extends in the Z direction starting from projecting element T.

All the bearing points $L_1$, $L_2$, $L_3$ thus constitute a connection to the "solid ground" of the weight sensor, i.e., the immobile mass represented by base body G.

Force-translating element $K_3$ comprises a lever arm H which, concealed by force-translating element $K_1$ shown in FIG. 3, runs asymmetrically relative to plane E through base body G in the X direction to coil S and past it. A calibration force can be introduced at the free end of lever arm H.

Figure 4:
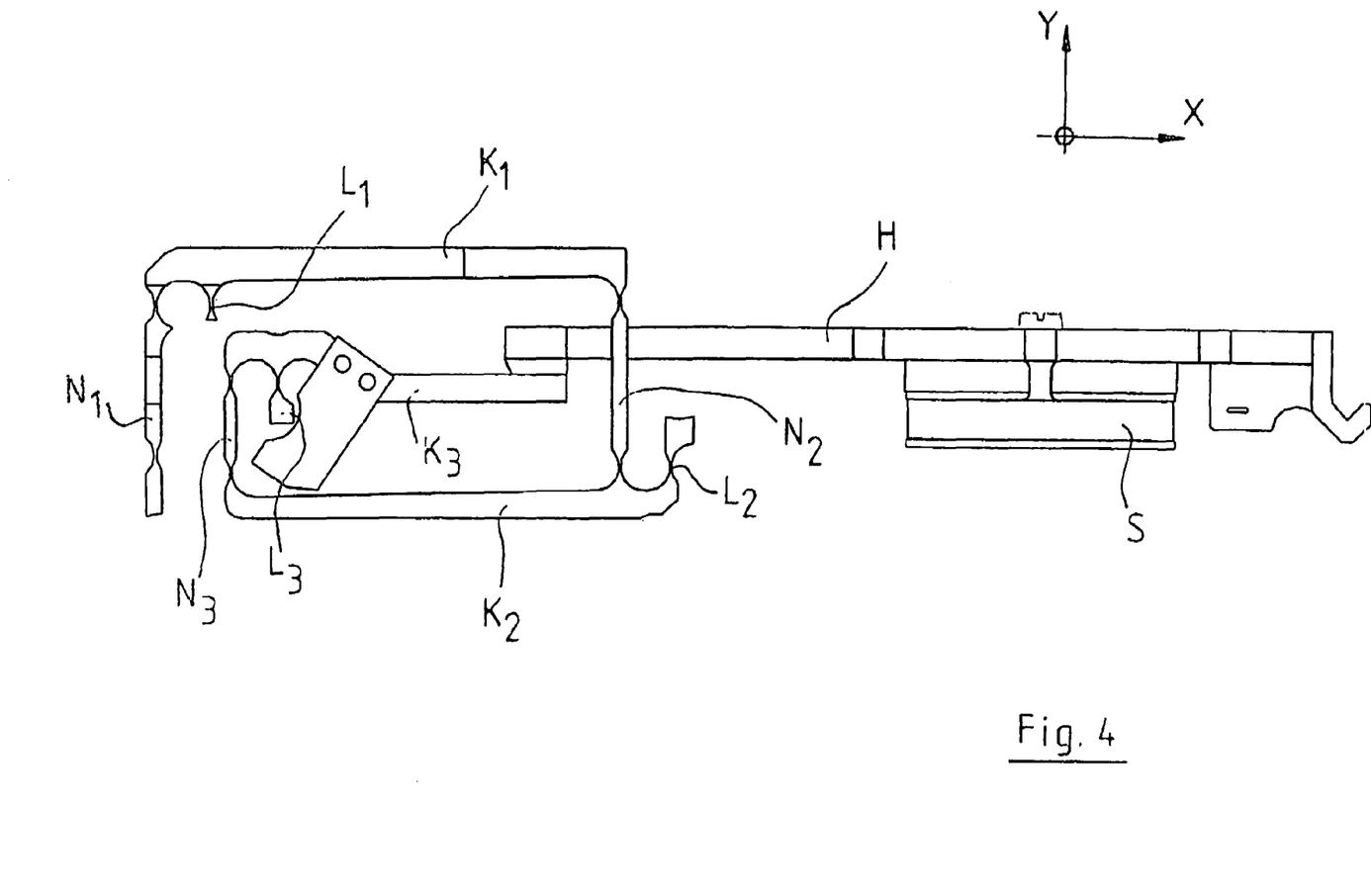
FIG. 4 is a side view showing the force-translating elements of the embodiment shown in FIG. 1.

The spiral arrangement of the force-translating elements becomes particularly clear in FIG. 4.

Also recognizable is first coupling element $N_1$ which transfers a force introduced essentially in the Y direction to first force-translating element $K_1$, arranged essentially horizontally. The latter rests on previously described bearing point $L_1$ and acts on second force-translating element $K_2$ via coupling element $N_2$.

Second force-translating element $K_2$ again extends in the direction towards first coupling element $N_1$, but terminates a short distance from it so as to be able to act via a third coupling element $N_3$ on third force-translating element $K_3$, which is arranged essentially parallel to and between the first two force-translating elements $K_1$ and $K_2$.

If one conceptually follows the introduced and transmitted force, then one recognizes, originating from first coupling element $N_1$, a force flow running counterclockwise that winds in a spiral-shaped structure into the interior of the arrangement.

Only third force-translating element $K_3$ interrupts this spiral structure in that a lever arm H articulated to it is led out of the spiral in the X direction through a cutout, not shown in detail. Coil S is arranged on this lever arm H in order to oppose a deflection of lever arm H.

As FIG. 4 likewise clarifies, only those force-translating elements in which all introduced or exiting forces are directed in parallel or antiparallel are used in the arrangement selected as an example.

If a tensile force directed downwards acts on coupling element $N_1$, then a bearing force in the opposite direction is produced in bearing point $L_1$, while a tensile force is created at coupling element $N_2$. The latter is compensated in bearing point $L_2$ and in coupling element $N_3$ by an opposing pressure force.

From this there originates in bearing point $L_3$ a tensile force acting in the Y direction, and the force ultimately moving the coil also points in the Y direction or in the direction opposite thereto. Depending on the type of force (tensile or compressive force) that is introduced into coupling element $N_1$, the directions of the respectively transferred forces change (in the Y direction or in the opposite direction antiparallel thereto). Forces in the X direction or in the Z direction, not shown, do not appear however, and therefore need not be absorbed at bearing points $L_1$, $L_2$ and $L_3$.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A weight sensor for an electronic balance, the weight sensor including:
   (a) a base body;
   (b) a load receiver spaced apart from the base body along a first axis;
   (c) guide members connected between the base body and the load receiver so that the load receiver is movable along a second axis with respect to the base body, the second axis being perpendicular to the first axis;
   (d) an elongated first force-translating element coupled to the load receiver to receive a deflecting force in response to a load acting on the load receiver along the second axis, the first force-translating element being located asymmetrically relative to a sensor plane which is defined by the first and second axes and which symmetrically divides the load receiver; and
   (e) a coil through which an electrical current is applied to compensate a deflection of the first force-translating element induced by the load acting on the load receiver,
   (f) wherein the first force-translating element, base body, load receiver, and guide members are monolithically formed.

2. The weight sensor of claim 1 further including at least one additional force-translating element coupled to receive a respective deflecting force in response to the load acting on the load receiver.

3. The weight sensor of claim 2 further including at least two additional force-translating elements, and wherein the first force-translating element and at least two additional force-translating elements are arranged together in a spiral shape when viewed in a direction perpendicular to the sensor plane.

4. The weight sensor of claim 3 wherein one of the additional force-translating elements represents a final force-translating element, and wherein the final force-translating element or an extension thereof penetrates the spiral shape.

5. The weight sensor of claim 1 further including a projecting part extending from the base body toward the load receiver, the projecting part providing a respective bearing point for the first force-translating element.

6. The weight sensor of claim 5 wherein the projecting part is formed asymmetrically relative to the sensor plane and the first force-translating element extends from one side of the projecting part in a direction perpendicular to the sensor plane.

7. The weight sensor of claim 5 wherein the projecting part includes at least one gradation along the first axis or in a direction perpendicular to the sensor plane.

8. The weight sensor of claim 5 wherein the rigidity of the projecting part in the area of the respective bearing point is qualitatively or proportionally formed according to a force acting at the respective bearing point from the first force-translating element.

9. The weight sensor of claim 5 wherein at least one section of the projecting part occupies a maximum height between the guide elements along the second axis.

10. The weight sensor of claim 1 further including at least one additional force-translating element and wherein the respective force-translating elements are defined between cutouts which are cut in from only one machining side of the weight sensor.

11. The weight sensor of claim 1 wherein the guide elements have no cutouts along the second axis.

12. The weight sensor of claim 1 wherein the coil is positioned such that it is symmetrically divided by the sensor plane.

13. The weight sensor of claim 1 further including a lever coupled to the first force-translating element, wherein the coil is mounted on the lever at a location spaced apart along the first axis from the coupling between the lever and the first force-translating element, and wherein the lever is formed separately from the first force-translating element.

14. The weight sensor of claim 13 wherein the lever is coupled to the first force-translating element through an additional force-translating element.

15. A component for a weight sensor, the weight sensor employing electromagnetic compensation to oppose the deflection of one or more force-translating elements in response to a load acting on a load receiver part of the component, the component including:
   (a) a base body;
   (b) a load receiver spaced apart from the base body along a first axis;
   (c) guide members connected between the base body and the load receiver so that the load receiver is movable along a second axis with respect to the base body, the second axis being perpendicular to the first axis; and
   (d) an elongated first force-translating element coupled to the load receiver to receive a deflecting force in response to a load acting on the load receiver along the second axis, the first force-translating element being located asymmetrically relative to a sensor plane which is defined by the first and second axes and which symmetrically divides the load receiver,
   (e) wherein the first force-translating element, base body, load receiver, and guide members are monolithically formed.

16. The component of claim 15 further including at least two additional force-translating elements, the first force-translating element and two additional force-translating elements being arranged together in a spiral shape when viewed in a direction perpendicular to the sensor plane.

17. The component of claim 15 further including a projecting part extending from the base body toward the load receiver, the projecting part (i) providing a bearing point for the first force-translating element, and (ii) being formed asymmetrically relative to the sensor plane, and wherein the first force-translating element extends from one side of the projecting part in a direction perpendicular to the sensor plane.

18. The component of claim 17 further including at least one additional force-translating element and wherein the projecting part provides a respective bearing point for each additional force-translating element.

19. The component of claim 15 further including a lever coupled to the first force-translating element, wherein the coil is mounted on the lever at a location spaced apart along the first axis from the coupling between the lever and the first force-translating element, and wherein the lever is formed separately from the first force-translating element.

20. A component for a weight sensor, the weight sensor employing electromagnetic compensation to oppose the deflection of one or more force-translating elements in response to a load acting on a load receiver part of the component, the component including:
   (a) a base body;
   (b) a load receiver spaced apart from the base body along a first axis;

(c) guide members connected between the base body and the load receiver so that the load receiver is movable along a second axis with respect to the base body, the second axis being perpendicular to the first axis;

(d) an elongated first force-translating element coupled to the load receiver via a coupling element so as to receive a first deflecting force in response to a load acting on the load receiver along the second axis; and (e) an elongated second force-translating element coupled to the first elongated force-translating element to receive a second deflecting force in response to the load acting on the load receiver, (f) wherein either the first force-translating element or the second force-translating element is located asymmetrically relative to a sensor plane which is defined by the first and second axes and which symmetrically divides the load receiver, and (g) wherein both the first force-translating element and the second force-translating element are monolithically formed with the base body.

21. The component of claim 20 further including a projecting part extending from the base body toward the load receiver, the projecting part (i) providing a respective bearing point for the first force-translating element and for the second force-translating element, and (ii) being formed asymmetrically relative to the sensor plane, and wherein the first force-translating element and second force-translating element each extends from one side of the projecting part in a direction perpendicular to the sensor plane.

22. The component of claim 21 further including a third force-translating component and wherein the projecting part provides a respective bearing point for the third force-translating element.

23. The component of claim 22 further including a lever connected to the third force-translating element, wherein a coil is mounted on the lever at a location spaced apart along the first axis from the connection between the lever and the third force-translating element, and wherein the lever is formed separately from the third force-translating element.

* * * * *